United States Patent
Mirdad

(10) Patent No.: US 12,127,901 B1
(45) Date of Patent: Oct. 29, 2024

(54) BLADE FOR INTERPROXIMAL CROWN LENGTHENING

(71) Applicant: KING SAUD UNIVERSITY, Riyadh (SA)

(72) Inventor: Amani Abdulaziz Mirdad, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 18/628,953

(22) Filed: Apr. 8, 2024

(51) Int. Cl.
*A61C 3/02* (2006.01)

(52) U.S. Cl.
CPC ...................... *A61C 3/02* (2013.01)

(58) Field of Classification Search
CPC .... A61C 3/02; A61C 3/00; A61C 3/12; A61C 3/06; A61B 17/3213; A61B 17/3209; A61B 17/32093; A61B 17/32096; A61B 17/3211; A61B 17/32113; A61B 17/144; A61B 2017/320074–320076; A61B 17/3217; B26B 9/00; B26B 9/02
See application file for complete search history.

(56) References Cited

U.S. PATENT DOCUMENTS

| | | | | |
|---|---|---|---|---|
| 3,610,246 A | * | 10/1971 | Salmon | A61B 17/3213 30/294 |
| 4,281,990 A | * | 8/1981 | Detsch | A61B 17/3213 433/144 |
| 4,299,572 A | * | 11/1981 | McKinney | A61C 3/12 433/144 |
| 5,324,299 A | | 6/1994 | Davison et al. | |
| 5,556,409 A | * | 9/1996 | Haining | A61B 17/3211 30/162 |
| D576,730 S | | 9/2008 | Kim | |

(Continued)

FOREIGN PATENT DOCUMENTS

DE    3624243 A1    1/1988

OTHER PUBLICATIONS

"StackedSkincare Dermaplaning Face Exfoliating Tool—Smooth, Radiant, Glowing Skin—Easy to Use Dermaplane Razor for Face—Hair Removal Blade for Eyebrows and Peach Fuzz"; printed on Feb. 28, 2024 from https://www.amazon.com/dp/B071KX2V4C?linkCode=ogi&tag=bp_links-20&ascsubtag=%5bartid|2089.g.23610458%5bsrc|%5bch|%5blt|.

*Primary Examiner* — Yogesh P Patel
(74) *Attorney, Agent, or Firm* — Nath, Goldberg & Meyer; James Lafave

(57) ABSTRACT

The blade for interproximal crown lengthening may be used to shave bone during osseous resection in an interproximal crown lengthening procedure. The blade includes a flat planar blade body with a forward shaving portion and a rear attachment portion, and longitudinally opposed forward and rear edges. The forward shaving portion has laterally opposed first and second edges, and the rear attachment portion also has laterally opposed first and second edges. The second edge of the forward shaving portion has first and second blunt portions with a sharp shaving portion positioned therebetween. The first blunt portion of the second edge of the forward shaving portion is located adjacent to the forward edge of the planar blade body such that the sharp shaving portion is spaced apart therefrom. An opening is formed through the rear attachment portion for attachment to a conventional scalpel handle or the like.

15 Claims, 1 Drawing Sheet

(56) References Cited

U.S. PATENT DOCUMENTS

| | | | |
|---|---|---|---|
| 7,455,521 B2 | 11/2008 | Fishburne, Jr. | |
| 9,248,004 B2 | 2/2016 | Araya | |
| D751,708 S | 3/2016 | Tapocik | |
| D768,298 S | 10/2016 | Tapocik | |
| 10,117,725 B2 | 11/2018 | Khouri | |
| 10,507,078 B2 | 12/2019 | Goldbecher | |
| D874,001 S | 1/2020 | Khouri | |
| 2006/0063131 A1* | 3/2006 | Kim | A61C 3/12 433/142 |

* cited by examiner

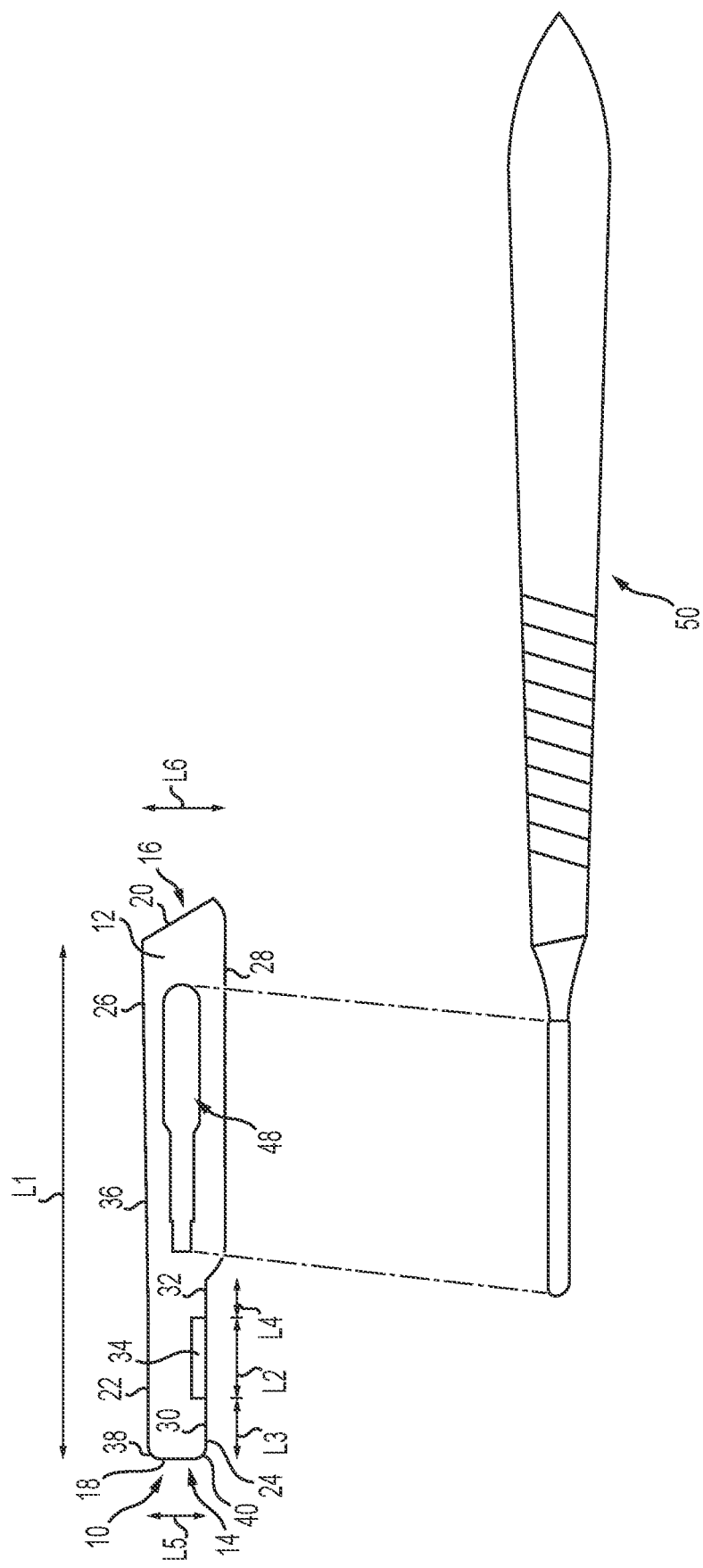

BLADE FOR INTERPROXIMAL CROWN LENGTHENING

BACKGROUND

Field

The disclosure of the present patent application relates to dental instruments, and particularly to a blade for shaving bone during osseous resection in an interproximal crown lengthening procedure.

Description of Related Art

Crown lengthening surgery may be performed for a wide variety of reasons, including aesthetic enhancement, exposure of subgingival caries, or exposure of a fracture. In addition to exposing supragingival tooth structure for restorative therapy, crown lengthening often requires dentists to excise tissue so that crown margins do not impinge on the biologic width, a factor which relates to the average value of the dentogingival junction. Crown lengthening can require either removal of soft tissue or osseous management, i.e., bone resection.

Osseous resection may involve either an ostectomy or an osteoplasty. An ostectomy involves removal of supporting bone and an osteoplasty involves removal of non-supporting bone. Traditionally, osseous resection is performed using hand chisels, bone files, high-speed rotary instrumentation, ultrasonic cutting devices or piezoelectric cutting devices. Such tools, however, are not well adapted for performing interproximal (i.e., between the teeth) crown lengthening, particularly due to their size. End cutting burs and bone files, for example, can easily cause damage to adjacent teeth, particularly when there is very little space between the patient's teeth. Further, piezoelectric and ultrasonic cutting devices are very costly and require numerous additional attachments. Thus, a blade for interproximal crown lengthening solving the aforementioned problems is desired.

SUMMARY

The blade for interproximal crown lengthening may be used to shave bone during osseous resection in an interproximal crown lengthening procedure. The blade includes a flat planar blade body with a forward shaving portion and a rear attachment portion, and longitudinally opposed forward and rear edges. The forward shaving portion has laterally opposed first and second edges, and the rear attachment portion also has laterally opposed first and second edges. The second edge of the forward shaving portion has first and second blunt portions with a sharp shaving portion positioned therebetween. The first blunt portion of the second edge of the forward shaving portion is located adjacent to the forward edge of the planar blade body such that the sharp shaving portion is spaced apart therefrom. An opening is formed through the rear attachment portion for attachment to a conventional scalpel handle or the like.

The first edge of the forward shaving portion and the first edge of the rear attachment portion may together define a linear, longitudinally-extending edge of the planar blade body; i.e., together, the first edges define a continuous linear edge of the entire planar blade body. The second edge of the forward shaving portion may extend parallel to the linear, longitudinally-extending edge of the planar blade body, and the forward edge of the planar blade body may extend orthogonal to the first and second edges of the forward shaving portion.

Additionally, the rear edge of the planar blade body may extend at an obtuse angle with respect to the linear, longitudinally-extending edge of the planar blade body. First and second corners respectively defined by the forward edge of the planar blade body with the laterally opposed first and second edges of the forward shaving portion may be rounded. Further, the first blunt portion and the sharp shaving portion may have equal longitudinal lengths, and the second blunt portion may have a longitudinal length less than the longitudinal lengths of the first blunt portion and the sharp shaving portion. A lateral distance between the second edge of the forward shaving portion and the linear, longitudinally-extending edge of the planar blade body may be less than a lateral distance between the second edge of the rear attachment portion and the linear, longitudinally-extending edge of the planar blade body; i.e., a lateral height or thickness of the forward shaving portion may be less than that of the rear attachment portion.

These and other features of the present subject matter will become readily apparent upon further review of the following specification.

BRIEF DESCRIPTION OF DRAWINGS

The sole drawing FIGURE illustrates a blade for interproximal crown lengthening.

DETAILED DESCRIPTION

The blade for interproximal crown lengthening 10 may be used to shave bone during osseous resection in an interproximal crown lengthening procedure. The blade 10 includes a flat planar blade body 12 with a forward shaving portion 14 and a rear attachment portion 16, and longitudinally opposed forward and rear edges 18, 20, respectively. The forward shaving portion 14 has laterally opposed first and second edges 22, 24, respectively, and the rear attachment portion 16 also has laterally opposed first and second edges 26, 28, respectively. The second edge 24 of the forward shaving portion 14 has first and second blunt portions 30, 32, respectively, with a sharp shaving portion 34 positioned therebetween. In use, the sharp shaving portion 34 is the sharp shaving or cutting edge for performing osseous resection. The first blunt portion 30 of the second edge 24 of the forward shaving portion 14 is located adjacent to the forward edge 14 of the planar blade body 12 such that the sharp shaving portion 34 is spaced apart therefrom. The sharp shaving portion 34 preferably has a double-sided cutting edge. The first blunt portion 30 is blunt, for example, to prevent trauma to the patient's tongue and/or the floor of the patient's mouth. The second blunt portion 32 is blunt to prevent trauma, for example, to the patient's lips.

An opening 48 is formed through the rear attachment portion 16 for attachment to a conventional scalpel handle 50 or the like. It should be understood that scalpel handle 50 is shown for exemplary purposes only, and that opening 48 is also shown for exemplary purposes only. Opening 48 may have any suitable shape and relative dimensions dependent upon the particular handle to which the blade 10 is being attached.

The first edge 22 of the forward shaving portion 14 and the first edge 26 of the rear attachment portion 16 may together define a linear, longitudinally-extending edge 36 of the planar blade body 12; i.e., together, the first edges 22, 26 define a continuous linear edge of the entire planar blade body 12, as shown in the sole drawing FIGURE. The second edge 24 of the forward shaving portion 14 may extend parallel to the linear, longitudinally-extending edge 36 of the planar blade body 12, and the forward edge 18 of the planar blade body 12 may extend orthogonal to the first and second edges 22, 24 of the forward shaving portion 14, as shown.

Additionally, the rear edge 20 of the planar blade body 12 may extend at an obtuse angle with respect to the linear, longitudinally-extending edge 36 of the planar blade body 12, as shown in the sole drawing FIGURE. First and second corners 38, 40 respectively defined by the forward edge 18 of the planar blade body 12 with the laterally opposed first and second edges 22, 24 of the forward shaving portion 14 may be rounded in order to minimize the risk of accidental injury to the patient. Further, the first blunt portion 30 and the sharp shaving portion 34 may have equal longitudinal lengths L3 and L2, respectively, and the second blunt portion 32 may have a longitudinal length L4 less than the longitudinal lengths L2, L3 of the sharp shaving portion 34 and the first blunt portion 30. Non-limiting exemplary dimensions include L2 and L3 each being 4 mm and L4 being 2 mm. Corresponding to these dimensions, the linear, longitudinally-extending edge 36 of the planar blade body 12 may have a non-limiting exemplary longitudinal length of 35 mm.

A lateral distance L5 between the second edge 24 of the forward shaving portion 14 and the linear, longitudinally-extending edge 36 of the planar blade body 12 may be less than a lateral distance L6 between the second edge 28 of the rear attachment portion 16 and the linear, longitudinally-extending edge 36 of the planar blade body 12; i.e., a lateral height or thickness of the forward shaving portion 14 may be less than that of the rear attachment portion 16, as shown in the sole drawing FIGURE.

It is to be understood that the blade for interproximal crown lengthening is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A blade for interproximal crown lengthening, comprising a planar blade body having a forward shaving portion and a rear attachment portion, and longitudinally opposed forward and rear edges,
   wherein each of the forward shaving portion and the rear attachment portion has laterally opposed first and second edges, and wherein the first edge of the forward shaving portion and the first edge of the rear attachment portion together define a linear, longitudinally-extending edge of the planar blade body, wherein a lateral distance between the second edge of the forward shaving portion and the linear, longitudinally-extending edge of the planar blade body is less than a lateral distance between the second edge of the rear attachment portion and the linear, longitudinally-extending edge of the planar blade body,
   wherein the second edge of the forward shaving portion comprises first and second blunt portions with a sharp shaving portion positioned therebetween,
   wherein the first blunt portion of the second edge of the forward shaving portion is located adjacent to the forward edge of the planar blade body such that the sharp shaving portion is spaced apart therefrom, and
   wherein an opening is formed through the rear attachment portion for attachment to a scalpel handle.

2. The blade for interproximal crown lengthening as recited in claim 1, wherein the second edge of the forward shaving portion extends parallel to the linear, longitudinally-extending edge of the planar blade body.

3. The blade for interproximal crown lengthening as recited in claim 2, wherein the forward edge of the planar blade body extends orthogonal to the first and second edges of the forward shaving portion.

4. The blade for interproximal crown lengthening as recited in claim 3, wherein the rear edge of the planar blade body extends at an obtuse angle with respect to the linear, longitudinally-extending edge of the planar blade body.

5. The blade for interproximal crown lengthening as recited in claim 3, wherein first and second corners respectively defined by the forward edge of the planar blade body with the laterally opposed first and second edges of the forward shaving portion are rounded.

6. The blade for interproximal crown lengthening as recited in claim 1, wherein the first blunt portion and the sharp shaving portion have equal longitudinal lengths.

7. The blade for interproximal crown lengthening as recited in claim 6, wherein the second blunt portion has a longitudinal length less than the longitudinal lengths of the first blunt portion and the sharp shaving portion.

8. A blade for interproximal crown lengthening, comprising a planar blade body having a forward shaving portion and a rear attachment portion, and longitudinally opposed forward and rear edges,
   wherein each of the forward shaving portion and the rear attachment portion has laterally opposed first and second edges,
   wherein the second edge of the forward shaving portion comprises first and second blunt portions with a sharp shaving portion positioned therebetween, wherein the first blunt portion and the sharp shaving portion have equal longitudinal lengths,
   wherein the first blunt portion of the second edge of the forward shaving portion is located adjacent to the forward edge of the planar blade body such that the sharp shaving portion is spaced apart therefrom, and
   wherein an opening is formed through the rear attachment portion for attachment to a scalpel handle.

9. The blade for interproximal crown lengthening as recited in claim 8, wherein the second blunt portion has a longitudinal length less than the longitudinal lengths of the first blunt portion and the sharp shaving portion.

10. The blade for interproximal crown lengthening as recited in claim 8, wherein the first edge of the forward shaving portion and the first edge of the rear attachment portion together define a linear, longitudinally-extending edge of the planar blade body.

11. The blade for interproximal crown lengthening as recited in claim 10, wherein the second edge of the forward shaving portion extends parallel to the linear, longitudinally-extending edge of the planar blade body.

12. The blade for interproximal crown lengthening as recited in claim 11, wherein the forward edge of the planar blade body extends orthogonal to the first and second edges of the forward shaving portion.

13. The blade for interproximal crown lengthening as recited in claim 12, wherein the rear edge of the planar blade body extends at an obtuse angle with respect to the linear, longitudinally-extending edge of the planar blade body.

14. The blade for interproximal crown lengthening as recited in claim 12, wherein first and second corners respectively defined by the forward edge of the planar blade body with the laterally opposed first and second edges of the forward shaving portion are rounded.

15. The blade for interproximal crown lengthening as recited in claim 10, wherein a lateral distance between the second edge of the forward shaving portion and the linear, longitudinally-extending edge of the planar blade body is less than a lateral distance between the second edge of the rear attachment portion and the linear, longitudinally-extending edge of the planar blade body.

* * * * *